United States Patent Office 3,547,991
Patented Dec. 15, 1970

3,547,991
PREPARATION OF HYDROXY CARBOXYLIC ACIDS
Irwin Schlossman, Cincinnati, Ohio, and Gerald Sugerman, Trenton, N.J., assignors to Halcon International, Inc., a corporation of Delaware
No Drawing. Continuation-in-part of application Ser. No. 289,430, July 29, 1963. This application June 29, 1967, Ser. No. 649,861
Int. Cl. C07c 59/04
U.S. Cl. 260—535       3 Claims

ABSTRACT OF THE DISCLOSURE

Cycloalkanol oxidates are rearranged to hydroxy carboxylic acids and/or derivatives thereof in the presence of a catalytic amount of a Group VI metal compound or of a vanadium compound.

RELATED APPLICATION

The subject application is a continuation-in-part of copending U.S. patent application, Ser. No. 298,430, filed July 29, 1963, now abandoned.

BACKGROUND OF THE INVENTION

The preparation and rearrangement of cycloalkanol oxidates are techniques known in the art. For example, the oxidation of a cycloalkanol with oxygen, or the oxidation of a cycloalkanone with hydrogen peroxide yields a material known as a "cycloalkanol oxidate." This oxidate consists of a mixture of peroxides. Typical of the cycloalkanol oxidates is cyclohexanol oxidate which is described more fully in an article by Brown et al., J.A.C.S., 77, 1756 (1955). Similarly, cyclopentanol oxidate is described by Brown et al. in J.A.C.S., 77, 1760 (1955). The oxidate may be rearranged in the presence of relatively large amounts of a mineral acid to a hydroxy carboxylic acid and/or derivatives thereof. The hydroxycarboxylic acid and/or derivative thereof may be converted to lactams and lactones. For example, cyclohexanol may be oxidized with oxygen to a cylohexanol oxidate which oxidate may be rearranged by means of mineral acids to yield hydroxycaproic acid and/or derivatives thereof. The foregoing rearrangement products may be converted to caprolactam in known manner by heating in the presence of ammonia and water.

The use of mineral acids as rearranging material has proven undesirable in commercial operation in that large quantities of mineral acids were required thereby necessitating complex recovery and recycle procedures.

OBJECTS OF THE INVENTION

It is an object of the present invention to provide a new class of materials which are effective to rearrange a cycloalkanol oxidate. Another object is to provide a new class of materials which are effective in relatively small quantities to rearrange a cycloalkanol oxidate. These and other objects of the present invention will be apparent from the following description.

SUMMARY OF THE INVENTION

It has now been found that a cycloalkanol oxidate may be rearranged to a hydroxy carboxylic acid and/or a derivative thereof by a Group VI metal compound or a vanadium compound. The metals of Group VI include selenium and tellurium of Group VI–A and chromium, molybdenum, and tungsten of Group VI–B. The metal compound is employed in catalytic quantities. Generally, from about 0.001 to about 0.2 millimole of metal compound (based on the metal) are employed for each gram of peroxide in the solution. Preferably, from about 0.1 millimole to about 1.5 millimoles of metal compound are used per gram of peroxide, and most desirably from about 0.3 millimole to about 1.0 millimole.

DETAILED DESCRIPTION

As used herein the term "cycloalkanol oxidate" includes both cycloalkanol oxidates and cycloalkanone peroxides. These two materials are peroxide-containing precursors which by rearrangement in known manner will yield hydroxy carboxylic acids and/or derivatives thereof. The present invention provides a new material which is effective when employed in catalytic quantities to effect this rearrangement. It is to be understood that the present invention is concerned with the rearrangement of these peroxide-containing cycloalkanol oxidates or cycloalkanone peroxides regardless of the manner in which the cycloalkanol oxidate or cycloalkanone peroxide is obtained.

By a Group VI metal compound or a vanadium compound is meant an acid containing one of these metals in the anion, an alkali metal salt, an ammonium salt, and an alkaline earth metal salt of such acids or the anhydrides of such acids and the corresponding metal oxides, as well as salts of these metals in which the metal is found in the cation, the hetero polyacids of these metals and salts thereof similar to those enumerated above. Examples of the acid anhydrides are silicic, telluric, chromic, molybdic, tungstic, or vanadic oxides. The hetero polyacids include the heteropolytungstic acids, phosphotungstic, arsenotungstic, bismotungstic, molybdotungstic, selenotungstic, tellurotungstic or phosphovanadic acid. The above polyacids are more broadly defined in Kirk and Othmer, Encyclopedia of Chemical Technology, vol. 7, pp. 458–465. Compounds of these metals wherein the metal is present as cation include inter alia the salts of both inorganic and organic acids, such as, for example, the sulfates, nitrates, halides, acetates, and naphthenates. The many compounds of the foregoing metals need not be listed since they will be obvious to those skilled in the art. Merely by way of illustration, however, a few specific examples will be mentioned: $CrO_3$, $MoO_3$, $WO_3$, $VOSO_4$, $K_2Cr_2O_7$, $Na_2CrO_4$, $Na_2WO_4$, $K_2MoO_4$, $Na_6W_7O_{24} \cdot 16H_2O$, $Na_2TeO_3$, $Na_2SeO_3 \cdot 5H_2O$, $Na_4VO_3$, $(NH_4)_2Cr_2O_7$, $(NH_4)_2MoO_4$, $(NH_4)_6W_7O_{24} \cdot 6H_2O$, $(NH_4)_2SeO_4$, $(NH_4)_2TeO_4$, $NH_4VO_3$, $CaCrO_4 \cdot 2H_2O$, $CaMoO_4$, $CaWO_4$, $Ba_2V_2O_7$, $NaHCr_2O_7$, and $NaHWO_4$.

It has been found that the particular reaction medium employed is of great importance. Outstanding results are obtained when the peroxide-containing precursor is dissolved in the corresponding alcohol. For example, where a cyclohexanol or cyclohexanone peroxide is rearranged, the reaction medium is preferably cyclohexanol. When the corresponding alcohol is used it participates in the reaction.

Theoretically the reaction of 1 mole of the peroxide-containing precursor, that is, the cyclohexanol oxidate or the cyclohexanone peroxide, with one mole of the alcohol yields 2 moles of the ketone. Hence, as will be shown subsequently in the examples, in excess of 100% of the ketone is produced based on the peroxide-containing precursor present. This reaction is of particular importance since cyclohexanone is a more valuable product than the solvent cyclohexanol. In some respects, it is proper to view the instant invention as a means, not only as a method of producing the hydroxycarboxylic acid and/or derivatives thereof, but also for obtaining high yields of the corresponding ketone. This by-product therefore makes the overall process more economically attractive.

Other solvents, though not as effective, enhance the reaction. These solvents must (1) be capable of dissolving the precursor and catalyst and, (2) be substantially inert to the reaction, i.e., maximum of 5% decomposition during the reaction. Examples of suitable solvents are t-butanol and the corresponding ketone (a cyclohexanone solvent is suitable in the case of the rearrangement of cyclohexanol oxidate). The amount of solvent employed may vary widely. Generally from 0.1 to 50 moles of solvent per mole of peroxide is used, preferably from 0.5 to 20 moles per mole.

In performing the reaction the control of acidity is important. It has been found that a pH from 4 to 8 (based on a water medium) is most desirable. The reaction time, while not critical may be conveniently based on peroxide decomposition. Preferably at least 95% of the peroxide should be permitted to decompose.

The cycloalkanols, the oxidates of which are treated herein, may be defined by the general formula:

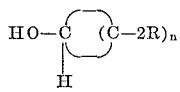

wherein $n$ is a whole integer from 4 to 11 and each R is selected from the group consisting of hydrogen; an alkyl group having from 1 to 16 carbon atoms, preferably from 1 to 6; an aryl group having from 6 to 14 carbon atoms; an aralkyl group having from 7 to 16 carbon atoms; an aryl group having a hetero atom in the ring system; a carboxyl group; a guoro group; and a chloro group. Examples of these compounds include cyclooctanol; cyclohexanol; cycloheptanol; cyclooctanol; cyclodecanol; and cyclododecanol. Substituted alkyl compounds include 2-methylcyclohexanol; 2,3-dimethylcyclooctanol, 2,2-dimethyl-4-ethylcyclododecanol; and 2-isopropylcyclopentanol. Other compounds include 2-benzylcyclohexanol; 4-phenylcyclohexanol; 4 - (1 - anthracenyl) cyclohexanol; 2-(3-methylbenzyl-) cyclohexanol; 2-(2-pyridyl-) cyclopentanol; 4-(4-pyridyl) cyclohexanol; 3-carbomethoxycycloheptanol; 4 - carbethoxycyclohexanol; 2,3,4,5-tetrafluorocyclohexanol, 3-(3 - thienyl) - cycloheptanol; 4-(6-quinolenyl)-cyclohexanol; and 2-(2-furanyl)-cyclopentanol.

The cycloalkanones, the peroxides of which are defined herein, may be defined by the general formula:

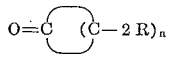

wherein $n$ and R are defined as above. Examples of these compounds include cyclopentanone; cyclohexanone; cycloheptanone; cyclooctanone; cyclodecanone; and cyclododecanone. Substituted alkyl compounds include 2-methylcyclohexanone; 2,3-dimethylcyclooctanone; 2,2-dimethyl-4-ethylcyclododecanone; and 2-isopropylcyclopentanone.

The hydroxycarboxylic acid and/or derivative thereof is generally of the omega type, i.e., having the hydroxyl radical on the carbon atoms at the end of the chain opposite the carboxyl group. However, in the case where a carbon atom of a carbon containing radical is bonded to the ortho position in respect to the peroxide group, acids in addition to the omega type are formed. More generally, it may be stated that $(n+1)$-hydroxycarboxylic acids and/or derivatives thereof are formed, wherein $(n+1)$ represents the number of carbons in the ring of the cycloalkanol precursor, as $n$ was previously defined. As an example of products formed, the oxidation and rearrangement of 2-methylcyclohexanol may be considered. The major product obtained from the rearrangement of the oxidate would be 6-hydroxyheptanoic acid. The hydroxycarboxylic acid derivatives include oligomers and polymers of the hydroxycarboxylic acid and simple esters of the acid.

The "cycloalkanol oxidate" may be obtained by the reaction of molecular oxygen with the cycloalkanol. It is preferable to oxidize from 10 to 30% of the cycloalkanol. The oxidation may be initiated by a peroxide and accomplished by passing molecular oxygen, pure or diluted with an inert gas, such as nitrogen, through the cyclohexanol with good agitation at temperatures of between 60 and 140° C. The pressures may be from atmospheric to 1000 p.s.i.a. or higher. The "oxidate" consists of a solution in the cycloalkanol of peroxide along with minor amounts of acid, esters and ketones. Generally the oxidate contains from .04 to 0.30 mole of peroxide per 100 grams of oxidate. Alternatively, the "cyclohexanol oxidate" may be obtained by the reaction of hydrogen peroxide with the cycloalkanone.

Furthermore concentration of the "oxidate" by distillation preferably under vacuum, can be achieved so as to obtain peroxide concentrations of up to about 0.5 mole of peroxide/100 grams. Such concentrates are also suitable.

The cycloalkanol oxidate, thus constituted, is treated in accordance with the invention at reaction temperatures between 0 and 200° C., preferably from 25 to 120° C. and most desirably between 40 and 95° C. The pressure, while not of particular significance, should preferably be approximately atmospheric. When higher temperatures are employed, such as in excess of 80° C., superatmospheric pressures are convenient to minimize the evaporation.

The hydroxycarboxylic acids and/or derivatives thereof may be readily converted to lactams and lactones. For example, by heating hydroxycaproic acid and/or derivatives thereof to about 300° C. for about 20 hours in an autoclave at a pressure of 2000 to 2500 p.s.i.g., in the presence of ammonia and water, caprolactam may be prepared.

In order to illustrate more fully the invention, attention is directed to the following examples:

GENERAL PROCEDURE

The catalyst is dissolved in the indicated quantity of cyclohexanone and water and the resulting mixture placed in the inner chamber of a double wall flask. The solvent is chosen so that boiling is achieved at the desired reaction temperature. The mixture is refluxed and the peroxidic reagent added over a period of 15 or 20 minctes. The reaction is continued until at least 95% of the peroxide is decomposed. An aliquot of the reaction mixture is then distilled under vacuum to give a distillate which is analyzed for cyclohexanol, cyclohexanone and, water and a residue. The residue is dissolved in aqueous ammonia and placed in a stainless steel pressure vessel. The vessel is sealed and heated for 4 hours at 325° C. The reaction is quenched by rapidly cooling to room temperature. The reaction mass is then analyzed for lactam. By calculation, the amount of lactam precursors, i.e., derivatives of hydroxycaproic acid is determined.

EXAMPLE 1

(a) A cyclohexanol oxidate containing 130 millimoles of peroxidic material is rearranged at 80° C. while in solution with 255 millimoles of cyclohexanone. One gram of chromic acid is present as the catalyst. After less than one hour over 95% of the peroxide is decomposed. After amination, analysis shows that the selectivity to lactam, and to cyclohexanone, based on the peroxide present, is 22% and 144% respectively. The remaining materials are various by-products, predominantly adipic and other acids.

(b) An analogous experiment wherein 148 millimoles of peroxidic material are present and 0.1 gram of the chromic acid, selectivity to the lactam is 30% and to the cyclohexanone 146%.

(c) Under the same conditions as in Example 1(b), with the exception that only 0.01 gram of chromic acid are employed, 27% selectivity to lactam and 140% to cyclohexanone is recorded.

EXAMPLE 2

The effect of the cyclohexanone solvent was determined by the following runs:

(a) A cyclohexanol oxidate containing 130 millimoles of peroxide material is rearranged in the presence of .01 gram of chromic acid at 80° C. Over 95% decomposition occurs after 1½ hours. No cyclohexanone is present. The selectivity to caprolactam precursors based on the peroxide present is 11%. The selectivity to cyclohexanone is 84%.

(b) An oxidate containing 148 millimoles of peroxidic material is admixed with 2040 millimoles of cyclohexanone and rearranged in the presence of one gram of chromic oxide. 34% selectivity to lactam precursors is noted. The rearranged solution contains about 70% of cyclohexanone.

EXAMPLE 3

By employing other catalysts or co-catalysts the pH of the reaction medium can be affected. The effect on this pH is illustrated by the following runs:

(a) An oxidate containing 130 millimoles of peroxide is admixed with 255 millimoles of cyclohexanone in the presence of 0.1 gram of potassium dichromate. After less than 15 minutes at 80° C. over 95% decomposition is obtained. 25% selectivity to lactam precursors is noted. The pH of the solution is approximately 7.

(b) Note the run described in Example 1(a). The pH of the solution is about 5 and the selectivity to the lactam precursors 22%.

(c) An oxidate containing 130 millimoles of peroxide is admixed with 255 millimoles of cyclohexanone at 80° C. 10 milligrams of chromic acid are employed as catalyst and one gram of pyridine added thereto so as to increase the pH to about 8.5. The selectivity to caprolactam is 21%, however, the cyclohexanone produced is reduced to 19%.

(d) A cyclohexanol oxidate containing 1.3 millimoles of peroxidic material per gram is rearranged at 80° for 2 hours. Five milligrams of chromic oxide is used as the catalyst. The rearrangement solution is kept saturated with ammonia. The selectivity to lactam is 16% and to cyclohexanone 15%. The pH of the solution, is 10.5, in excess of that preferred.

(e) A cyclohexanol oxidate containing 130 millimoles of peroxidic material is rearranged in solution with 255 millimoles of cyclohexanone, 0.01 gram chromic acid and 1.0 gram of sulfuric acid at 80° C. The decomposition of the peroxide is significantly slowed by the presence of the sulfuric acid, requiring over night for 95% conversion. The lactam selectivity is 25% and the cyclohexanone selectivity 129%.

EXAMPLE 4

The use of other catalytic material is shown in the following table:

All of the runs are conducted at about 80° C. with a cyclohexanol oxidate containing about 130 millimoles of peroxidic material.

TABLE 1

| Catalyst | Gms. | Cyclohexanone, gms. | Time for 95% decomposition, hrs. | Selectivity, percent Lactam precursor | Selectivity, percent Cyclohexanone |
| --- | --- | --- | --- | --- | --- |
| Phosphomolybdic acid | 0.1 | 25 | Overnight | 21 | 125 |
| Do | 0.1 | None | 7 | 19 | 41 |
| Phosphotungstic acid | 1.0 | 25 | 15 | 21 | 136 |
| Phosphochromic acid | 0.01 | 100 | ~3 | 23 | 14 |
| Do | 0.10 | 25 | ~0.5 | 20 | 138 |
| Potassium dichromate | 0.1 | 25 | <0.25 | 30 | 125 |
| Do | 0.1 | 25 | <1 | 30 | 125 |
| Chromic acetate | 0.05 | 200 | ~2 | 27 | 141 |
| Selenium dioxide | 0.01 | 25 | Overnight | 25 | 116 |
| Phosphovanadic acid | 0.05 | 25 | 4 | 25 | 139 |
| 6-borochromic acid | 0.1 | 25 | ~2 | 24 | 118 |
| 6-borotungstic acid | 0.1 | 25 | ~2 | 21 | 143 |
| 6-boromolybdic acid | 0.1 | 25 | ~2 | 23 | 121 |

The above runs illustrate the high yields of both lactam precursors, i.e., the hydroxycaproic acid and/or derivatives thereof, and the cyclohexanone.

EXAMPLE 5

To show the unique characterists of the Group VI metals herein described, other metallic catalysts were tested under the same conditions of temperature and peroxide concentrations as in Example 4. The results obtained are shown in the following table:

TABLE 2

| Catalyst | Gms. | Cyclohexanone, gms. | Time for 95% decomposition, hrs. | Selectivity, percent Lactam precursor | Selectivity, percent Cyclohexanone |
| --- | --- | --- | --- | --- | --- |
| Sodium bromide | 0.2 | 25 | 48 | Trace | |
| Stanous oxide | 0.1 | 25 | 4 | 23 | 9 |
| Ferric acetate | 0.1 | None | 14 | 14 | 134 |
| Cupric acetate | 0.1 | None | 5 | 9 | 105 |
| Manganese acetate | 0.1 | None | Overnight | 24 | 20 |
| Boric acid | 0.1 | | | 9 | 57 |
| Phosphoric acid | 0.1 | | | 17 | 38 |
| Sulfuric acid | 0.1 | | | 25 | 32 |
| None (thermal) | 0 | 200 | 30 | 11 | 41 |
| Do | 0 | 200 | 30 | 10 | 48 |

These runs show that other materials do not significantly alter the reaction. Cf. the runs where only thermal decomposition occurs, where high yields of lactam precursors are obtained, the yield of the cyclohexanone drops off sharply.

EXAMPLE 6

Repeating Example 1(a), with the exception that an equivalent amount of cyclohexanone peroxide dissolved in cyclohexanol is substituted for the oxidate, similar selectivities to hydroxycaproic acid and/or derivatives thereof are obtained.

EXAMPLE 7

Using a methylcyclohexanol oxidate in place of the cyclohexanol oxidate, Example 1(a) is repeated. A selectivity to 6-heptanoic acid and/or derivatives thereof of 20% is obtained.

EXAMPLE 8

Molecularoxygen is bubbled through cyclopentane to form a cyclopentanol oxidate. The oxidate containing 100 millimoles peroxide is rearranged at 60° C. by using 0.1 gram of chromic acid. Analysis shows the formation of about 20% of derivatives of omega-hydroxyvaleric acid, based on peroxide decomposed.

EXAMPLES 9–14

In each of the following examples the alcohol is oxidized at 120° C. and atmospheric pressure with an oxygen flow rate of 0.07 liter per minute. 1% by weight of CaCo₃ is added to the charge and 0.4 gram methyl-ethyl ketone peroxide is used as initiator. The following table indicates the amount of oxygen absorbed and the peroxide concentration for the various alcohols.

TABLE 3

| Example | Alcohol | Grams | Mols | O² absorbed, liters | Peroxide conc., m.m./gram |
|---|---|---|---|---|---|
| 9 | Cyclooctanol | 70 | 0.55 | 1.2 | 0.6 |
| 10 | Cyclododecanol | 70 | 0.38 | 0.9 | 0.4 |
| 11 | 4,4-dimethylcyclohexanol | 70 | 0.55 | 1.2 | 0.6 |
| 12 | 4-chlorocyclohexanol | 70 | 0.52 | 1.2 | 0.2 |
| 13 | 4-phenylcyclohexanol | 70 | 0.40 | 0.9 | 0.5 |
| 14 | 2-(2-pyridyl)-cyclopentanol | 70 | 0.43 | 0.9 | 0.1 |

The oxidate from each of Examples 9–14 is combined with 0.25 part of the ketone corresponding to the starting alcohol. The oxidate is rearranged by being contacted with 0.75 part of trifluoro acetic acid at 60° C. for 5 hours. Significant amounts of hydroxy carboxylic acids and/or derivatives thereof are formed from the oxidate in each case.

It will be understood that modifications and variations may be affected without departing from the spirit of the invention.

What is claimed is:
1. A process for the preparation of a hydroxy carboxylic acid which comprises rearranging, an oxidate of a cyclic secondary alcohol having from 5 to 12 ring carbon atoms by contacting said oxidate at a temperature between about 0° C. and 200° C. with a catalytically effective amount of a Group VI metal compound or a vanadium compound.

2. A process according to claim 1 wherein the oxidate of the cyclic secondary alcohol is a material selected from the group consistings of a cycloalkanol oxidate or a cycloalkanone peroxide.

3. A process according to claim 1 wherein the Group VI metal is at least one member selected from the group consisting of selenium, tellurium, chromium, molybdenum, or tungsten.

References Cited
UNITED STATES PATENTS

| 3,444,194 | 5/1969 | Minischi et al. | 260—531 |
| 3,234,212 | 2/1966 | Winnick et al. | 260—239.3 |
| 3,405,173 | 10/1968 | Sugerman et al. | 260—535 |
| 3,405,174 | 10/1968 | Sugerman et al. | 260—535 |

HENRY R. JILES, Primary Examiner
R. T. BOND, Assistant Examiner

U.S. Cl. X.R.
260—239.3, 295, 531